W. F. TOWNS.
Earthen-Bucket.

No. 160,486. Patented March 2, 1875.

Witnesses.
Mary A. Stockwell
Ann E. Stockwell

Inventor
William F. Towns
by Bradford Howland
his Attorney.

UNITED STATES PATENT OFFICE.

WILLIAM F. TOWNS, OF RAVENNA, OHIO.

IMPROVEMENT IN EARTHEN BUCKETS.

Specification forming part of Letters Patent No. 160,486, dated March 2, 1875; application filed February 13, 1875.

*To all whom it may concern:*

Be it known that I, WILLIAM F. TOWNS, of Ravenna, Portage county, Ohio, have invented an Improved Bucket, of which the following is a specification:

The nature of my invention is an earthen pail or bucket having a bail, by which it may be conveniently carried.

The accompanying drawings illustrate the invention, and form a part of this specification.

Figure 1:
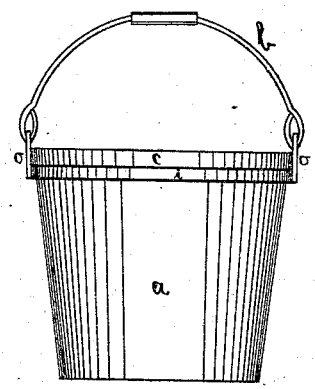
Figure 2:
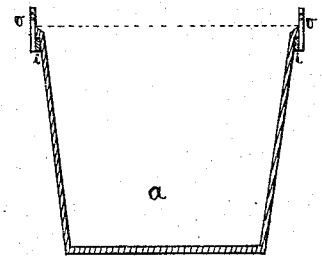

Figure 1 is a front elevation. Fig. 2 is a vertical section.

$b$ is the bail of the bucket $a$. $c$ is a slight flange around the outside of the top of the bucket, to prevent the hoop $i$ from slipping off. The hoop $i$ is placed just beneath the flange $c$, and the ears $o\ o$ are attached to the hoop $i$ on opposite sides of the bucket. The ends of the bail $b$ are attached in the ordinary manner to the ears $o\ o$.

I claim as my invention—

The earthen bucket $a$, having a projecting flange, $c$, in combination with the bail $b$, substantially as herein set forth.

WILLIAM F. TOWNS.

Witnesses:
    GEORGE F. ROBINSON,
    BRADFORD HOWLAND.